July 31, 1945.  E. D. TILLYER ET AL  2,380,481
OPHTHALMIC MOUNTING
Filed Feb. 24, 1941  3 Sheets—Sheet 1
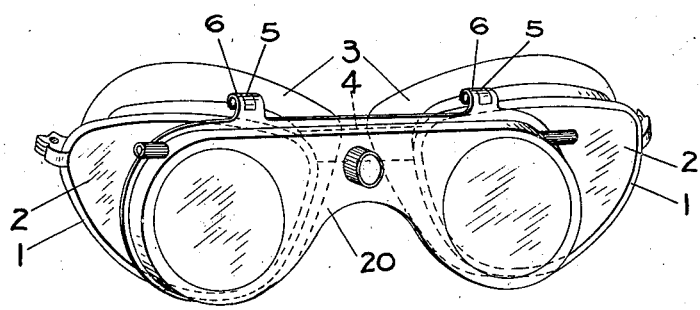
Fig. I
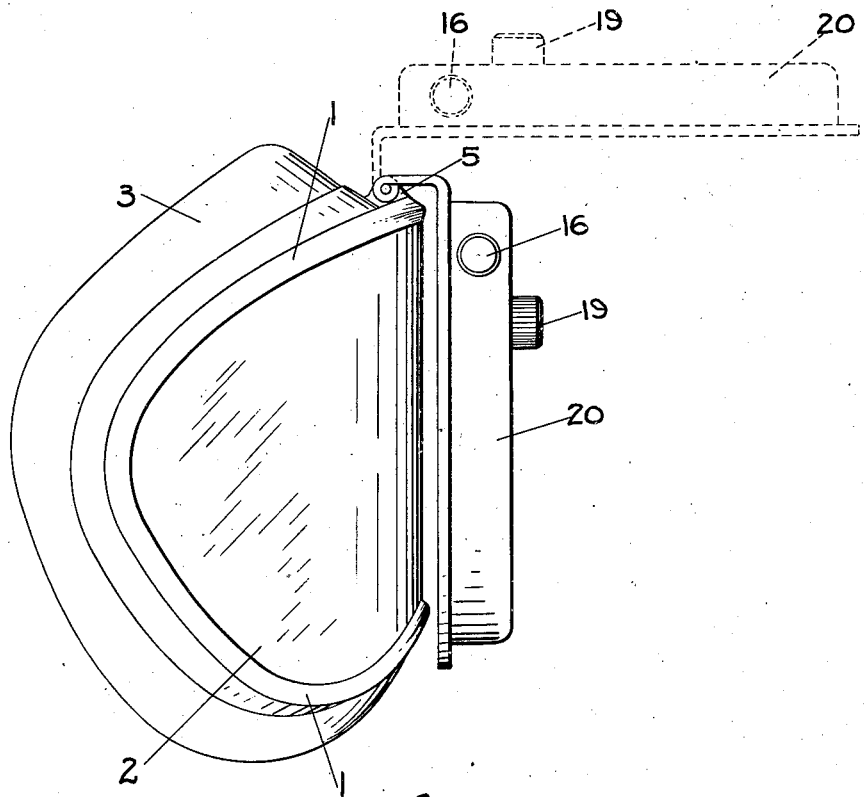
Fig. II
INVENTOR.
EDGAR D. TILLYER
WILLIAM J. JOYCE
HAROLD R. MOULTON
BY
ATTORNEY.

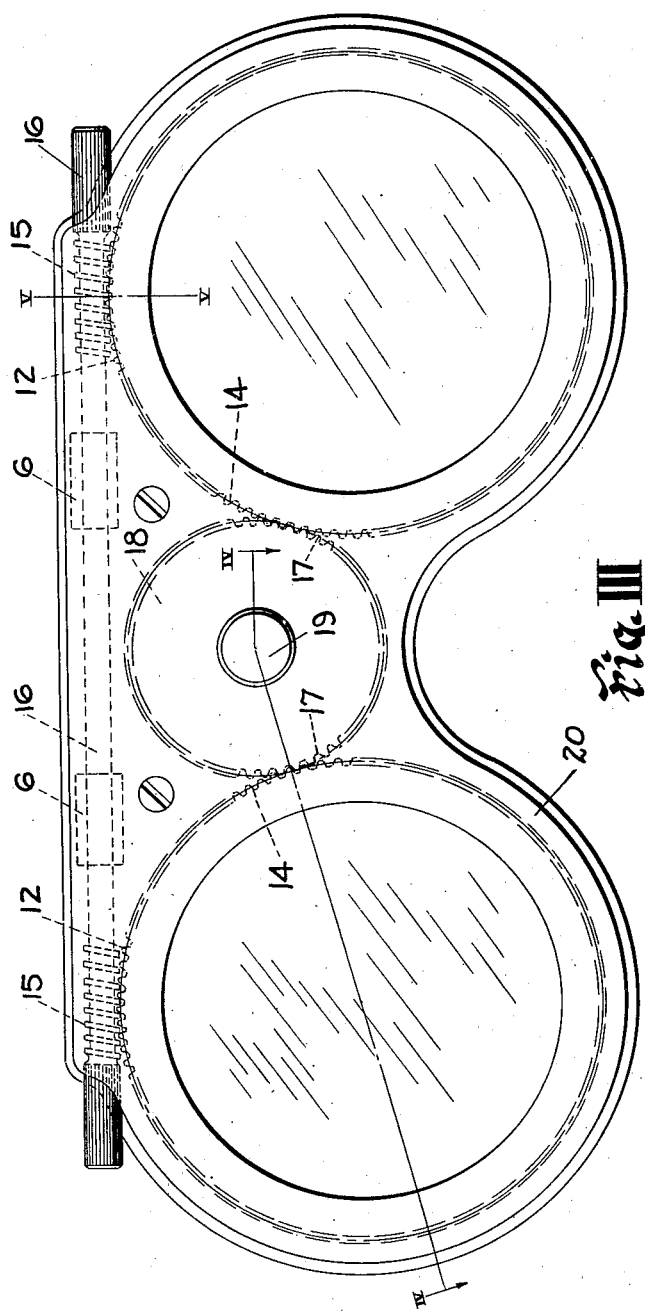
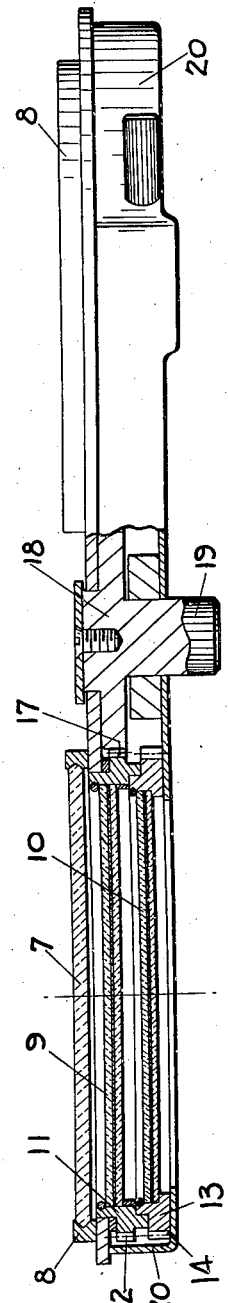

July 31, 1945.　　E. D. TILLYER ET AL　　2,380,481
OPHTHALMIC MOUNTING
Filed Feb. 24, 1941　　3 Sheets-Sheet 3
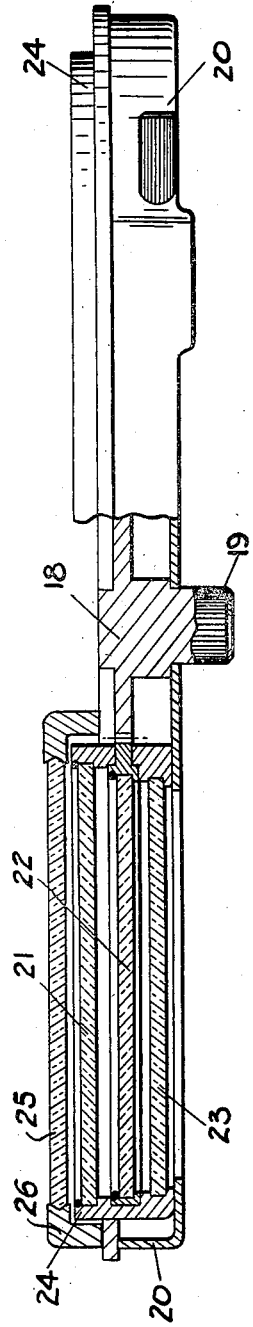
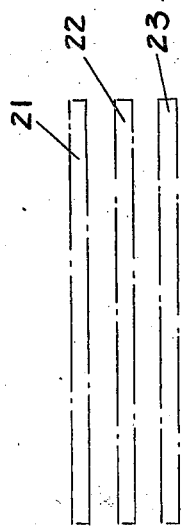
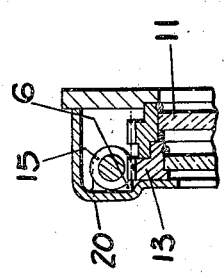
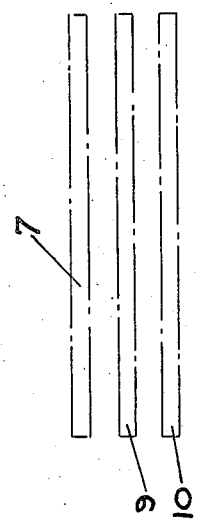
INVENTOR.
EDGAR D. TILLYER
WILLIAM J. JOYCE
HAROLD R. MOULTON
BY Louis L. Gagnon
ATTORNEY.

Patented July 31, 1945

2,380,481

UNITED STATES PATENT OFFICE 2,380,481

OPHTHALMIC MOUNTING

Edgar D. Tillyer, William J. Joyce, and Harold R. Moulton, Southbridge, Mass., assignors to American Optical Company, Southbridge, Mass., a voluntary association of Massachusetts Application February 24, 1941, Serial No. 380,192

3 Claims. (Cl. 88—41)

This invention relates to improvements in optical mountings and has particular reference to optical mountings for polarizing and filtering light.

A principal object of the invention is to provide improved means for adapting optical mountings to the angle or line of polarization of the incident light and to vary the transmission of the light transmitting medium.

Another object of the invention is to provide improved means for giving good definition of light in combination with said polarizing means.

Another object of the invention is to provide improved means for changing the density of transmission of the polarizing means.

Another object of the invention is to provide improved means for moving the entire polarizing system as a unit together with means for shifting one member of the polarizing system with respect to another.

Another object of the invention is to provide an improved optical mounting for aviators that will provide operating means for adjustment for incident polarized light, for density of transmission and definition.

Another object of the invention is to provide, simple, efficient and economical means for moving the polarizing system as a unit, for moving one member of that system with respect to the others and for obtaining good definition of object.

Other objects and advantages of the invention will become apparent from the following description taken in conjunction with the accompanying drawings. Since it will be apparent that many changes in the details of construction and arrangement of parts may be made without departing from the spirit of the invention as set forth in the accompanying claims, it is therefore not desired to limit the invention to the exact matters shown and described for the preferred forms only have been shown and described by way of illustration.

Referring to the drawings:

Fig. I is a perspective view showing an aviation goggle embodying the invention;

Fig. II is a side view of Fig. I, in perspective and enlarged;

Fig. III is a front view, enlarged, of a lens cell attachment for an aviation goggle and the means of operating the cells;

Fig. IV is a plan view with a portion thereof in section on line IV—IV of Fig. III;

Fig. V is a partial cross section on line V—V of Fig. III;

Fig. VI is a view similar to Fig. IV showing a modification in the lens cells;

Fig. VII is a diagrammatic view showing the arrangement of the lens cells of Fig. IV; and Fig. VIII is a diagrammatic view showing the arrangement of the lens cells of Fig. VI.

Hitherto light polarizing systems have been made in which two light polarizing lens members are mounted one over the other with means by which one of said lenses may be rotated with respect to the other to change the density of transmission. The defect of this system is that both lenses cannot be rotated first as a unit to adapt the polarizing system to the line of incident polarized light before one lens is changed axially with respect to the other. Also the density of the polarizing system has only been changed by rotating one polarizing member with respect to the others, i. e., by changing the axial relations. The axial relation of the polarizing means has not been held fixed. It is therefore a principal object of this invention to provide polarizing means adaptable to the axis of polarization of the incident polarized light and to provide new and improved means whereby the axes of the two polarizing members may be held in fixed relation. Another important object is to improve the definition of polarizing optical mountings.

Referring to the drawings wherein similar reference characters denote corresponding parts throughout:

In Figs. I and II there is indicated an aviation glass or goggle having the lens rims 1, the lenses 2, and the resilient rubber eye cups 3 to fit on the face around the eyes. The two lens rims are connected centrally at 4. The lenses are curved to conform to the curve of the face. They may be glass or plastic resin and provided with finished optical surfaces. They may be of any desired color and of desired light transmitting properties. They are of a type usual in the prior art.

To provide for the attachment of the lens cell holder lugs 5 are provided on the rims 1. To these lugs 5 is pivotally or hingedly connected the frame or holder for the lens cells of this invention. The arrangement and details of this frame or holder is shown in Figs. III, IV, V and VI. The frame carries the lugs 6 pivotally secured to the lugs 5. This pivotal connection permits the whole frame or attachment to be held in place in alignment before the eyes when in use and to be thrown back up out of the way on the forehead when not in use. This frame or holder comprises a casing in which are mounted cells containing light transmitting elements.

These light transmitting elements in one instance are as indicated in Figs. IV and VII in which the element 7 is a light transmitting element having the property of giving good definition. A commercial glass sold on the market under the name Noviol is a preferred form for this purpose. This element 7 is mounted in the rim 8 and is preferably so mounted as not to be rotatable.

The elements 9 and 10 are light transmitting elements having the property of polarizing light. A commercial form of this material is now on the market and is sold under the name Polaroid. It is an acetate film in which is embedded a plurality of crystals with their axes oriented in parallelism. It is a synthetic polarizing medium.

The arrangement of the light transmitting elements of Fig. IV is diagrammatically shown in Fig. VII. The element 7, the light definition element is mounted so as not to be rotatable. The polarizing elements 9 and 10, are mounted so that the two elements may be rotated together as a unit and so that 9 may be rotated independently with respect to 10, so that the density of transmission may be changed. By this means the polarizing unit may first be rotated to the line of the incident polarized light and then the density of transmission altered by change of relationship of the axes of the two polarizing elements.

The mechanism for producing this rotation of the polarizing elements is shown in Figs. III and IV. The polarizing element 9 is mounted in the cell 11, having gear teeth 12 on its periphery.

The polarizing element 10 is mounted in the cell 13 having gear teeth 14 on its periphery.

The gear teeth 14 are engaged by the worm gears 15 on the turn rod 16. Turning of the rod 16 rotates the cells 13 on each side and the elements 10 mounted in said cells.

The gear teeth 12 engage gear teeth 17 on the gear wheel 18 having the turn stud 19. Turning the stud 19 rotates the cells 11 on each side and the polarizing elements 9 mounted in said cells.

The cells 11 and 13 are mounted in the cover plate or casing 20.

The operation of this arrangement is as follows: When worm gears 15 are rotated cells 13 which engage them turn carrying cells 11 with them by friction between the said cells. Spur gear 18 which engages cells 11 turns freely as cells 11 and 13 turn simultaneously but when spur gear 18 is turned cells 11 turn and cells 13 are locked by the worm gears 15.

From the above it will be seen that the two polarizing elements 9 and 10 may be turned together as a unit, and that 9 may be turned independently of 10. The definition element 7 is permanently held against rotation.

In Figs. VI and VIII is shown a different arrangement and a different method of changing the density of transmission of the polarizing elements.

Referring to Fig. VIII, 21 is a polarizing element, 22 is a quarter wave plate, which has the property of rotating the plane of polarization, and which will be described hereunder, and 23 is a second polarizing element. These elements are so mounted that all three of them may be rotated as a unit, and then element 22 may be rotated independently of the other two elements.

The mechanism for this arrangement is shown in Fig. VI. The cells 24 have peripheral teeth and are turned by the worm gears 15 as before. These cells carry all three elements 21, 22, and 23 as a unit. The element 22 has peripheral teeth engaging the spur wheel 18. This element 22 is mounted so it may be rotated in the cell 24.

The operation of this arrangement is as follows: All three elements 21, 22 and 23 are rotated by turning the rod carrying the worm gears and then 22 may be rotated independently of the other elements by turning the spur gear 18.

The quarter wave plate 22 may be a sheet of mica or a sheet of synthetic plastic possessing the optical properties of mica or other natural crystals. This plate has the property of changing the density of transmission from total light to total dark when rotated 45° between two layers of polarizing material. The properties and operation of wave plates are described in Physical Optics by Robert W. Wood, third edition. The MacMillan Company, New York City, 1934, page 352. There are now obtainable synthetic plates that have these properties.

In Fig. VI there is shown a definition plate 25 supported by an annular member 26 secured to the casing 20. If desired, the definition plate 25 may be omitted. The definition plate 25 functions in a manner similar to and has the characteristics of the definition plate 27.

The important feature of the invention is that the whole polarizing system may be aligned as a unit with the line of incident polarized light, and then the density varied by moving one of the transmission elements. To this may be added a definition element if desired. The arrangement shown allows use with a regular goggle mounting and can be used or not as desired by merely raising or lowering the attachment on its pivots. The goggle used may also contain a cell attachment on the inside in which prescription lenses may be carried to adapt the goggle to the wearer's refractive requirements.

It will be seen that this invention provides means for taking care of all transmission and protection requirements such as wind and glare protection, definition of object, adjustable to the incident polarized light, and to density of transmission.

The adjustments for incident polarized light and density regulation are operably controlled by simple turn rods operating both eyes of the device simultaneously.

From the foregoing it will be seen that simple, inexpensive and efficient means have been provided to obtain all the objects and advantages of the invention.

Having described our invention we claim:

1. An optical mounting comprising spaced cells aligned with the two eyes, a pair of spaced light polarizing means mounted in each cell in holding means having peripheral gear teeth, a turn rod having worm gears engaging the teeth of the holding means for each cell, a quarter wave member positioned between the polarizing members in each cell and held in holding means having peripheral gear teeth and a central gear wheel engaging the teeth of the holding means for the wave member for each cell, said wave member holding means being mounted to be frictionally engaged by the holding means of the polarizing members to turn as a unit with said members, and being independently turnable with respect to the polarizing members by means of said central gear wheel.

2. An optical mounting comprising spaced cells aligned with the two eyes, a pair of spaced light polarizing means mounted in each cell in holding means having peripheral gear teeth, a turn rod having worm gears engaging the teeth of the holding means for each cell, a quarter wave member positioned between the polarizing members in each cell and held in holding means having peripheral gear teeth and a central gear wheel engaging the teeth of the holding means for the wave member for each cell, said wave member holding means being mounted to be frictionally engaged by the holding means of the polarizing members to turn as a unit with said members, and being independently turnable with respect to the polarizing members by means of said central gear wheel, and a light transmission definition member non rotatably held in alignment with the light polarizing members.

3. An optical mounting comprising spaced cells aligned with the two eyes, a pair of spaced light polarizing members mounted in each cell in holding means having peripheral engagement means, motion imparting means engaging the engagement means of each cell for imparting a rotary movement thereto and for retaining said polarizing members at given adjusted positions, axis of polarized light altering means between the polarizing members in each cell and held in holding means having peripheral engagement means, and motion imparting means engaging the engagement means of said holding means for said axis of polarized light altering means for imparting a rotary movement thereto, said holding means for the axis of polarized light altering means being mounted to be frictionally engaged by the holding means of the polarizing members to turn as a unit with said polarizing members and being independently rotatable with respect to the polarizing members, while said polarizing members are held at given adjusted positions, by manipulation of the motion imparting means for said axis of polarized light altering means.

EDGAR D. TILLYER.
WILLIAM J. JOYCE.
HAROLD R. MOULTON.